(12) United States Patent  
Ryu et al.

(10) Patent No.: US 9,066,061 B2  
(45) Date of Patent: Jun. 23, 2015

(54) VIDEO INFORMATION REPRODUCTION METHOD AND SYSTEM, AND VIDEO INFORMATION CONTENT

(75) Inventors: Tomoaki Ryu, Tokyo (JP); Satoshi Minami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 490 days.

(21) Appl. No.: 13/498,243

(22) PCT Filed: Apr. 14, 2010

(86) PCT No.: PCT/JP2010/002707  
§ 371 (c)(1),  
(2), (4) Date: Mar. 26, 2012

(87) PCT Pub. No.: WO2011/064909  
PCT Pub. Date: Mar. 6, 2011

(65) Prior Publication Data  
US 2012/0207215 A1   Aug. 16, 2012

(30) Foreign Application Priority Data  
Nov. 27, 2009   (JP) ................. 2009-270330

(51) Int. Cl.  
*H04B 1/66* (2006.01)  
*H04N 9/804* (2006.01)  
(Continued)

(52) U.S. Cl.  
CPC ........ *H04N 9/8042* (2013.01); *G11B 20/10527* (2013.01); *G11B 2020/10759* (2013.01);  
(Continued)

(58) Field of Classification Search  
CPC ........... G09G 2340/02; G09G 2370/10; G11B 2020/10759; G11B 2020/10805; G11B 2020/10814; G11B 20/10527; H04N 21/2401; H04N 21/242; H04N 21/4302; H04N 21/4325; H04N 21/44016; H04N 21/6332; H04N 21/6405; H04N 21/8547; H04N 9/80; H04N 9/8042; H04N 9/8063; H04N 9/8205  
USPC .......................... 348/43; 375/240.01–240.28  
See application file for complete search history.

(56) References Cited

U.S. PATENT DOCUMENTS 6,061,399 A * 5/2000 Lyons et al. .................. 375/240  
6,507,616 B1 * 1/2003 Ryu .......................... 375/240.13  
(Continued)

FOREIGN PATENT DOCUMENTS

CN 1760982 A 4/2006  
CN 101164335 A 4/2008  
(Continued)

OTHER PUBLICATIONS

Akyildiz et al., "Multimedia Group Synchronization Protocols for Integrated Services Networks," IEEE Journal on Selected Areas in Communications, vol. 14, No. 1, Jan. 1, 1996, pp. 162-173.  
(Continued)

*Primary Examiner* — Behrooz Senfi  
(74) *Attorney, Agent, or Firm* — Birch, Stewart, Kolasch & Birch, LLP

(57) ABSTRACT

A plurality of I- or P-pictures for displaying video images with the same data as the last frame of the main data of the content are added as reproduction synchronization adjustment frames after the last frame of the main data; when reproduction leads a reference reproducing device, more synchronization adjustment frames are reproduced (ST11); when reproduction lags, fewer synchronization adjustment frames are reproduced (ST9). Reproduction can be synchronized among a plurality of reproducing devices (42) that read data from a storage medium and reproduce the data, or receive data by network delivery and reproduce the data, under conditions where system clock correction by use of PCR is impossible.

12 Claims, 10 Drawing Sheets

VIDEO REPRODUCING DEVICE  
IN THE EMBODIMENT

(51) Int. Cl.
*G11B 20/10* (2006.01)
*H04N 9/80* (2006.01)
*H04N 21/242* (2011.01)
*H04N 21/432* (2011.01)
*H04N 21/44* (2011.01)
*H04N 21/6332* (2011.01)
*H04N 21/8547* (2011.01)
*H04N 7/12* (2006.01)
*H04N 9/806* (2006.01)
*H04N 9/82* (2006.01)
*H04N 21/24* (2011.01)
*H04N 21/43* (2011.01)
*H04N 21/6405* (2011.01)

(52) U.S. Cl.
CPC .............. *G11B2020/10805* (2013.01); *G11B 2020/10814* (2013.01); *H04N 9/80* (2013.01); *H04N 9/8063* (2013.01); *H04N 9/8205* (2013.01); *H04N 21/242* (2013.01); *H04N 21/4325* (2013.01); *H04N 21/44016* (2013.01); *H04N 21/2401* (2013.01); *H04N 21/4302* (2013.01); *H04N 21/6332* (2013.01); *H04N 21/6405* (2013.01); *H04N 21/8547* (2013.01); *G09G 2340/02* (2013.01); *G09G 2370/10* (2013.01)

(56) References Cited

U.S. PATENT DOCUMENTS

| 2006/0083486 A1 | 4/2006 | Kanemaru et al. |
| 2009/0213777 A1 | 8/2009 | Ogawa et al. |
| 2010/0208856 A1 | 8/2010 | Fuchikami et al. |
| 2014/0002599 A1* | 1/2014 | Lee et al. .................. 348/43 |

FOREIGN PATENT DOCUMENTS

| JP | 2005-244605 A | 9/2005 |
| JP | 2006-287642 A | 10/2006 |
| JP | 2008-96756 A | 4/2008 |
| JP | 2009-71632 A | 4/2009 |
| JP | 2009-81654 A | 4/2009 |
| JP | 2009-205396 A | 9/2009 |

OTHER PUBLICATIONS

Boronat et al., "Multimedia group and inter-stream synchronization techniques: A comparative study," Information Systems, vol. 34, No. 1, Mar. 1, 2009, pp. 108-131.

Boronat Segui et al., "An RTP/RTCP based approach for multimedia group and inter-stream synchronization," Multimed Tools Appl., vol. 40, No. 2, Jun. 25, 2008, pp. 285-319.

* cited by examiner

OVERALL SYSTEM CONFIGURATION
IN THE EMBODIMENT

TRANSITIONS IN AMOUNT OF DATA
REMAINING IN BUFFER MEMORY

VIDEO PACKET : $V_1, V_2, V_3$ ······
AUDIO PACKET : $A_1, A_2, A_3$ ······
PSI/SI PACKET : $S_1$ ······

GENERAL TS STREAM PACKET STRUCTURE

CHANGES IN AMOUNT OF DATA REMAINING
IN BUFFER OF REPRODUCING DEVICE WITH
FASTEST REPRODUCTION TIME AND REPRODUCING
DEVICE WITH SLOWEST REPRODUCTION TIME

VIDEO PACKET : $V_1$, $V_2$, $V_3$ ......
AUDIO PACKET : $A_1$, $A_2$, $A_3$ ......
PSI/SI PACKET : $SI_1$ ......
ADJUSTMENT INFORMATION PACKET : $T_1$ ......

EXEMPLARY TS PACKET STRUCTURE
IN THE EMBODIMENT

```
Adjust_info(){
    for(i=0 ; i < num_of_PES ; i++){
        PTS_for_adjust(i);
        SPN_for_adjust(i);
    }
}
```

SYNTAX OF SYNCHRONIZATION ADJUSTMENT
PACKET IN THE EMBODIMENT

PROCESSING SEQUENCE
IN FIRST EMBODIMENT

FIG.10 PROCESSING SEQUENCE IN FIRST EMBODIMENT

REPRODUCTION TIMINGS OF REPRODUCING DEVICES AFTER SYNCHRONIZATION ADJUSTMENT

RELATIONSHIP BETWEEN TYPICAL MPEG DATA DECODING AND DISPLAY SEQUENCES

RELATIONSHIP BETWEEN DECODING AND DISPLAY
SEQUENCES OF SYNCHRONIZATION ADJUSTMENT
FRAMES IN THE EMBODIMENT

PROCESSING SEQUENCE IN SECOND EMBODIMENT

VIDEO INFORMATION REPRODUCTION METHOD AND SYSTEM, AND VIDEO INFORMATION CONTENT

FIELD OF THE INVENTION

The present invention relates to a video information reproduction method and a video information reproduction system for reproducing encoded data delivered via a network or encoded data read from storage media. The present invention also relates to content delivered via networks or read from storage media.

BACKGROUND ART

A program clock reference (PCR) included in a transport stream (TS) is generally used for synchronizing reproduction of content delivered to a plurality of reproducing devices without causing underflow or overflow of buffer memory (see, for example, Patent Document 1).

PRIOR ART REFERENCES

Patent Documents

Patent document 1: Japanese Patent Application Publication No. 2008-96756

SUMMARY OF THE INVENTION

Problem to be Solved by the Invention

In terrestrial digital broadcasts and other broadcasts using a TS (Transport Stream), data are transmitted from the data transmitter at a fixed bit rate, so that if the system clock of the decoder does not perfectly match the standard 27 MHz, the buffer memory may be emptied or overflow, making normal reproduction impossible. An available means of avoiding this problem is to use the PCR (Program Clock Reference) to correct the system clock of the decoder periodically. This enables the system clocks of all reproducing devices that receive a TS to be adjusted to the same time, so that when a plurality of reproducing devices are lined up to create a display, the display devices are all perfectly synchronized.

DVD and Blu-ray players, and other devices for reproducing MPEG data, read the data from storage media in a way that prevents their decoder buffers from underflowing or overflowing, so that in general they do not require time correction of their system clocks, using PCR. For this reason, when data that have been read from storage media are sent to a plurality of reproducing devices and displayed on the plurality of reproducing devices, for example, system clock differences may cause the displays to lose synchronization after a few hours.

The same thing may also happen in reproduction by network delivery. Data delivered via networks are not transmitted at a fixed bit rate as in broadcasting, so that the reproducing devices generally perform reproduction from large buffer memories, and as with DVD or the like, system clock correction by use of PCR is impossible. During prolonged reproduction, therefore, different display devices may lose synchronization.

In signage applications, for example, multicast content must be reproduced in synchronization at all reproducing devices, but as described above, when data are read from storage media or delivered via a network, PCR cannot be used, so that during prolonged reproduction by a plurality of display devices, the problem of gradual loss of display synchronization occurs.

The present invention addresses the above problem with the object of enabling a plurality of video information reproducing devices that reproduce data read from storage media or receive and reproduce data delivered via a network to synchronize their reproduction even under conditions in which system clock correction by use of PCR is not possible.

Means for Solving the Problem

The inventive video information reproduction method is a video information reproduction method for receiving content formed by a sequence including at least intra-frame encoded image information and inter-frame forward prediction encoded image information, and including time stamp information, from a content server connected by a network or from storage media, at a plurality of video information reproducing devices and decoding and reproducing the content at the video information reproducing devices; the video information reproduction method comprises:

a detection step for selecting a video information reproducing device from among the plurality of video information reproducing devices as a reproduction time reference and detecting a reproduction time difference between each of the video information reproducing devices and the reference video information reproducing device; and an adjustment step for adjusting a number of frames to be reproduced, when lagging the reference video information reproducing device, by subtracting a number of frames of encoded content to be reproduced from a number of frames to be reproduced by the reference video information reproducing device according to the lag time, and when leading the reference video information reproducing device, by adding a number of frames of encoded content to be reproduced to the number of frames to be reproduced by the reference video information reproducing device according to the lead time.

Effects of the Invention

In the reproduction of streamed data or data read from storage media, the effect of the present invention is that reproduction time can be synchronized among a plurality of video information reproducing devices with a high degree of accuracy, since the total number of frames of content data to be reproduced can be individually set in each reproducing device.

MODE FOR CARRYING OUT THE INVENTION

First Embodiment

Figure 1:
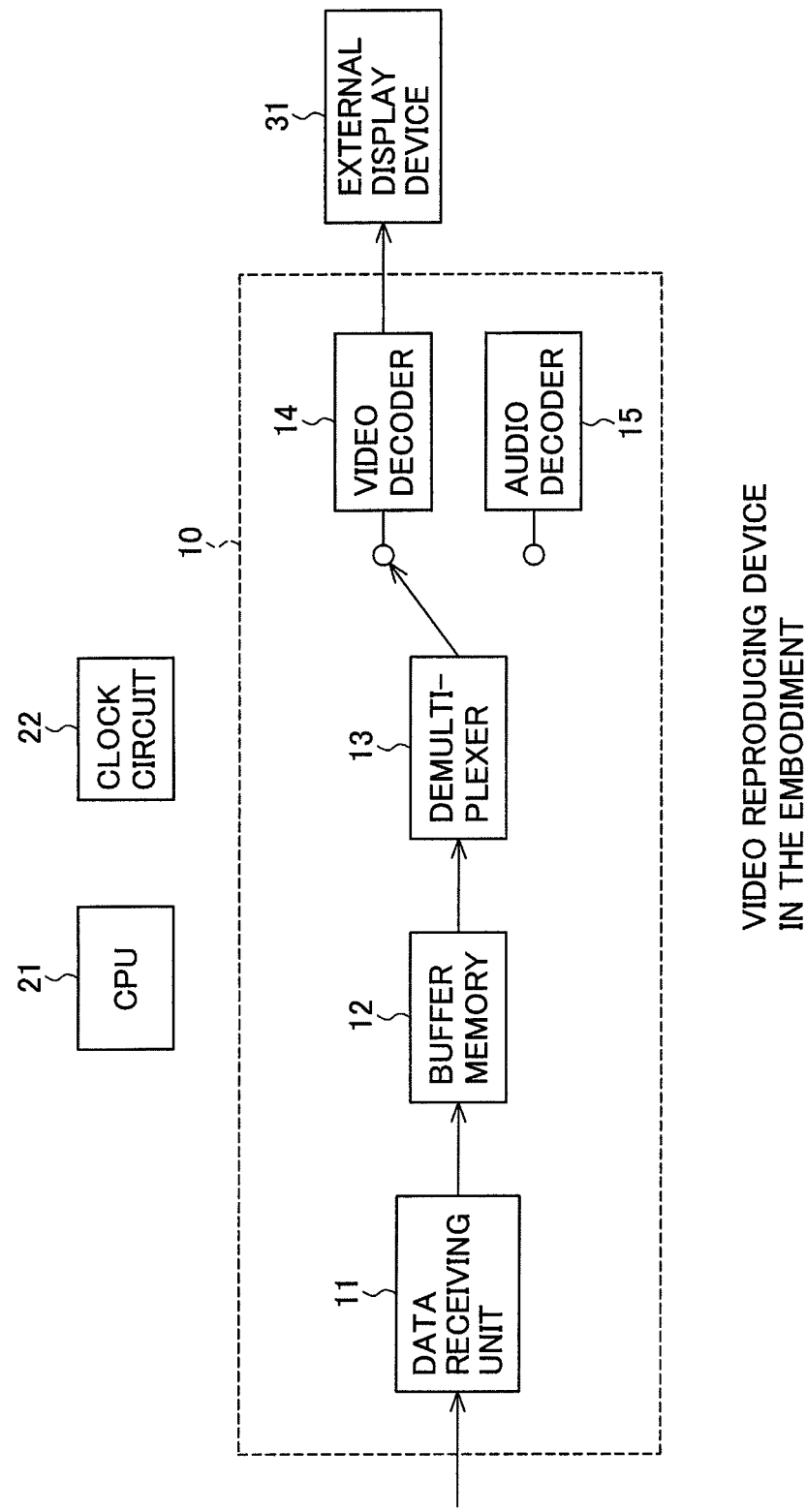
FIG. 1 is a block diagram schematically showing an example of the structure of a video information reproducing device used for implementation of a video information reproducing method according to a first embodiment of the invention.

FIG. 1 is a block diagram schematically showing an example of the structure of a video information reproducing device used to implement the video information reproducing method according to the first embodiment of the present invention. The video information reproducing device shown is a device for reproducing content data distributed via a network from a content server.

Figure 2:
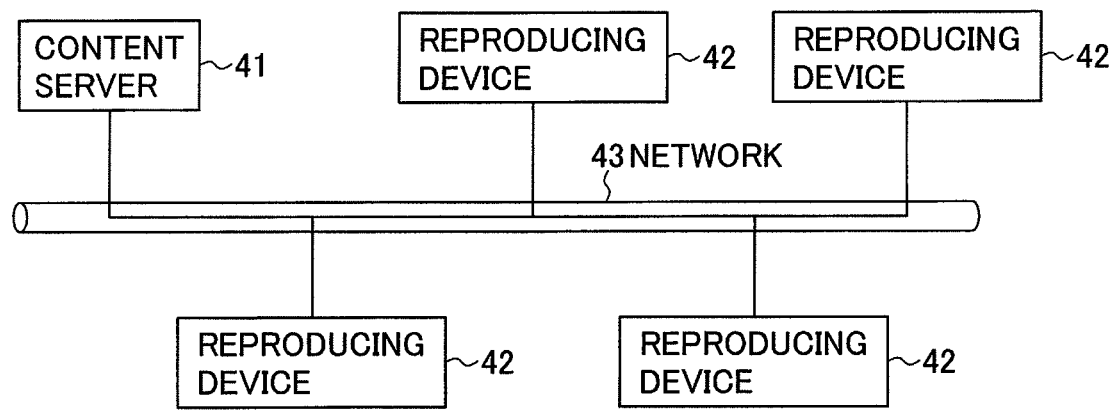
FIG. 2 is a diagram conceptually illustrating the overall structure of a video information reproducing system including the video information reproducing device according to the first embodiment and a content server connected to the video information reproducing device via a network.

FIG. 2 is an overall block diagram conceptually illustrating a video information reproducing system including the video information reproducing device in FIG. 1 and a content server. Data are distributed from the content server 41 to each reproducing device 42 via a network 43 configured as, for example, an Ethernet (registered trademark). The description that follows assumes that data are distributed on the network 43 by broadcast distribution using UDP (User Datagram Protocol).

The reproducing devices 42 shown in FIG. 2 are configured as shown, for example, in FIG. 1.

The video information reproducing device shown in FIG. 1 has a reproducing section 10 as a means for reproducing data delivered from the content server 41 and a CPU 21 as a reproduction control means for executing control of the device as a whole. The reproducing section 10 includes a data receiving unit 11 for receiving data distributed from the content server 41, a buffer memory 12 for temporarily storing the data received by the data receiving unit 11, a demultiplexer 13 for separating data read from the buffer memory 12 into audio and video information, a video decoder 14 for decoding the video information, and an audio decoder 15 for decoding the audio information. The video signal output from the video decoder 14 is sent to an external display device 31, by which a video picture is displayed. The audio signal output from the audio decoder 15 is sent to an audio output device (not shown) for output of sound.

In this embodiment, it is assumed that data are delivered to the data receiving unit 11 in a TS (Transport Stream). In this case, the video information and audio information are divided into PES (Packetized Elementary Stream) packets, and then further divided into TS packets, the video information and audio information being delivered in a multiplexed state.

In the PES packets, PES header information is added to an ES (Elementary Stream) that has been encoded according to MPEG-2, H.264, or the like. PES packets are packetized in units of reproduction time control; in the video information, for example, one image frame (picture) becomes one PES packet. The header information of a PES packet includes a time stamp such as, for example, a PTS (Presentation Time Stamp) that provides reproduction time information.

A TS packet has a fixed length (188 bytes). A PID (Packet ID) unique to the data type is added to the header portion of each TS packet. The PID makes it possible to distinguish between video information, audio information, and system information (such as reproduction control information). The demultiplexer 13 reads the PID, thereby distinguishes between video information and audio information, and assigns the data to the corresponding decoder.

Although this embodiment is described on the assumption of data divided into 188-byte TS packets, other (non-TS) data formats that enable video information to be distinguished from audio information may be used. When no audio information is provided and only video information data are delivered, the data may be delivered directly in a PES (Packetized Elementary Stream) without being divided into TS packets. In this case, the demultiplexer 13 and the audio decoder 15 in the reproducing section 10 are unnecessary.

In the video information reproducing device in this embodiment, the CPU 21 functions as a received data control means for constantly monitoring the capacity of the buffer memory 12, thereby controlling the buffer memory 12 to keep it from underflowing or overflowing.

Figure 3:
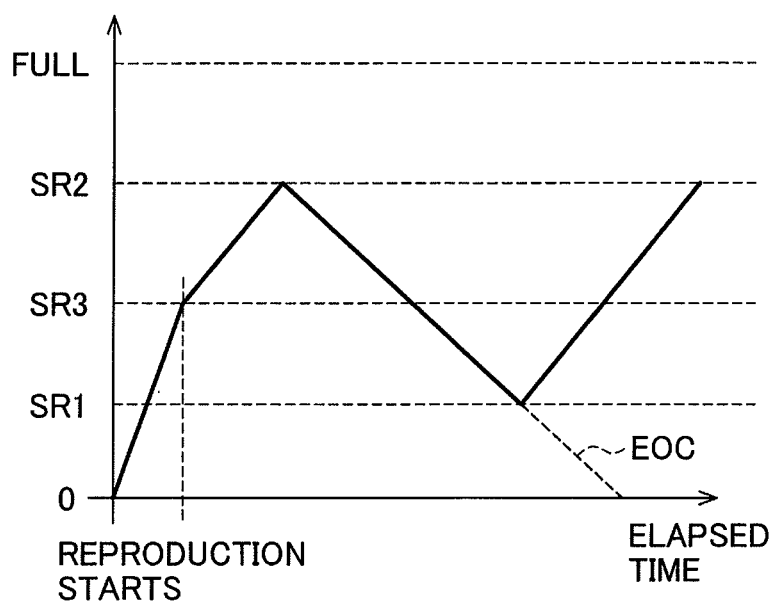
FIG. 3 is a diagram showing exemplary transitions of the remaining amount in the buffer memory of the video information reproducing device in FIG. 1.

FIG. 3 is a diagram illustrating transitions in the capacity of the buffer memory 12. The CPU 21 constantly monitors the capacity of the buffer memory 12 and keeps the content server 41 notified of the remaining capacity of the buffer memory 12.

When the reproducing device performs reproduction in a state in which the content server 41 is not transmitting data and as a result the amount of data remaining in the buffer memory 12 diminishes to a lower limit (a first prescribed threshold value) SR1, the content server 41 starts (resumes) data transmission to the reproducing device 42; when the amount remaining in the buffer memory 12 reaches an upper limit (a second prescribed threshold value) SR2, the content server 41 stops transmitting data to the reproducing device 42.

When the remaining space in the buffer memory 12 again falls to the lower limit SR1, the content server 41 resumes data transmission.

By repetition of the above operations, data transmission is controlled so that the amount of data remaining in the buffer memory 12 is kept between the upper limit SR2 and the lower limit SR1.

The CPU 21 monitors the reproduction time of the video decoder 14 in the same reproducing device 42, notifies the content server 41 of the time, and also operates as a means of providing control by increasing or decreasing the size of the data transferred from the content server 41 to the buffer memory 12 according to the time skew of the video decoder 14 in the same reproducing device 42 with respect to a reference reproduction time received from the content server 41.

The content server 41 notifies each reproducing device 42 of the length of its skew from the reproduction time of the standard reproducing device 42. The CPU 21 performs data control such that when the reproduction time of the reproducing device 42 leads the reproduction time of the standard reproducing device 42, a larger amount of the data received at the data receiving unit 11 is stored in the buffer memory 12, and when the reproduction time lags the reproduction time of the standard reproducing device 42, a smaller amount of data is stored in the buffer memory 12. A detailed description of the control of the amount of data stored in the buffer memory 12 will be given later.

Figure 4:
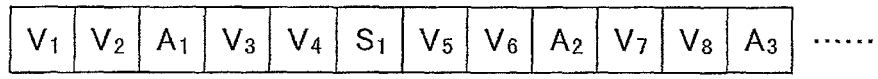
FIG. 4 is a diagram showing an example of the packet structure of a general TS stream.

FIG. 4 is a diagram illustrating the structure of the TS data delivered from the content server 41. The audio and video information in the TS data are divided into 188-byte packets (TS packets), and video packets in which image data are stored, audio packets in which sound data are stored, and PSI/SI packets in which PAT, PMT, and other system information are stored are multiplexed to prevent audio or video reproduction from being interrupted.

Next, the sequence up to reproduction of the content delivered from the content server 41 will be described. When a request for start of reproduction (a request for data transmission for reproduction) is output from the user to the content server 41, the content server 41 starts broadcast transmission of the TS data to each reproducing device 42. (The request for start of reproduction may be performed by sending a signal from one of the reproducing devices or may be given by separate control equipment (not shown).)

Each reproducing device 42 receives the distributed TS data with its data receiving unit 11 and starts storing the data in the buffer memory 12. At this time, the content server 41 arbitrarily selects a representative device among all the reproducing devices 42, and constantly monitors the amount of data remaining in the buffer memory 12 of the representative reproducing device 42. When the content server 41 detects that the amount remaining in the buffer memory 12 has exceeded a third prescribed threshold value (initial reproduction starting value) SR3 that is greater than the lower limit value SR1 and smaller than the upper limit value SR2 in FIG. 3, it commands all the reproducing devices 42 to start reproduction (starting display and output at the reproducing devices).

When the reproduction command is issued from the content server 41, in each reproducing device 42, the packets of TS data in the buffer memory 12 are sent to the demultiplexer 13, where the data are separated into video information, audio information, and PSI/SI information according to the PIDs of the corresponding packets. The separated video information is sent to the video decoder 14, from which a decoded video signal is output to the external display device 31. The separated audio information is sent to the audio decoder 15, from which a decoded audio signal is sent to an audio output device (not shown) that outputs sound. Even after the reproduction of audio and video has started, as long as data transmission continues from the content server 41, the amount remaining in the buffer memory 12 increases with time. However, the rate of increase is slower than when reproduction is not being performed in the reproducing device, so that the slope of the remaining amount curve decreases after the start of reproduction.

As described earlier, the CPU 21 keeps the content server 41 notified of the amount remaining in the buffer memory 12; when the content server 41 detects that the amount remaining in the buffer memory 12 has reached the upper limit value SR2, it stops transferring data.

When data transfer is stopped, the amount remaining in the buffer memory 12 of each of the reproducing devices 42 gradually decreases as the data are consumed by the decoders. When the content server 41 detects that the amount remaining in the buffer memory 12 in the representative reproducing device 42 has reached the lower limit value SR1, the content server 41 resumes data distribution.

By repeating the above operations, reproduction is continued without interrupting the picture or sound by causing the buffer memory 12 to underflow or overflow.

However, in the last part of each item of content, even when the amount remaining in the buffer memory 12 is detected to have reached the lower limit value SR1, since there are no more data to transmit, the remaining amount dwindles further and finally reaches zero, as indicated by dotted line in FIG. 3.

The thresholds SR1, SR2, and SR3 should be set at appropriate values according to the capacity of the buffer memory 12, the reproduction bit rate, etc., but values of these thresholds will not be particularly mentioned since they do not relate directly to this application.

With this procedure, reproduction is started concurrently at all the reproducing devices 42, but the oscillation frequencies of the crystal oscillators in the clock circuits 22, which generate reference times for the video decoders 14, are not exactly the same: there are differences among the oscillator frequencies in the reproducing devices 42. The output time of the decoded video data is controlled according to the PTS (included in the header information of the PES packets) in the video information based on the reference times. Specifically, each PES image is reproduced and output at a time (a relative time from the start of reproduction of the content) designated by the PTS included in the header information of the PES, while decoding and time adjustment (delay) are performed, by detecting that the time (the time relative to the time of reproduction of the top of the content) designated by the PTS included in the header information of the PES has been reached, by comparison with the result of counting clock pulses generated by the crystal oscillator in the reproducing device 42. The reproduction time skew mentioned above means the difference between the time at which reproduction of a PES packet including a PTS is timed by the clock circuit 22 in one reproducing device and the time at which the reproduction of a PES packet including the same PTS is timed by the clock circuit 22 in another reproducing device.

Because of the above configuration, over time, the reproduction times of the reproducing devices 42 come to differ due to frequency error in their crystal oscillators. For example, given that the accuracy of the crystal oscillators is ±20 ppm, there is a difference of 40 ppm between a reproducing device 42 with the fastest display and a reproducing device 42 with the slowest display, and if reproduction takes place continuously for twenty-four hours, a time skew of about three seconds can occur.

In addition, since the content server 41 controls data distribution by taking one of all the reproducing devices 42, as a representative device, and monitoring the data remaining in the buffer memory 12 in the representative device, if the reproducing device 42 with the largest error is taken as the representative device, the likelihood of occurrence of underflow and overflow in the buffer memories 12 of the other reproducing devices 42 becomes high.

Figure 5:
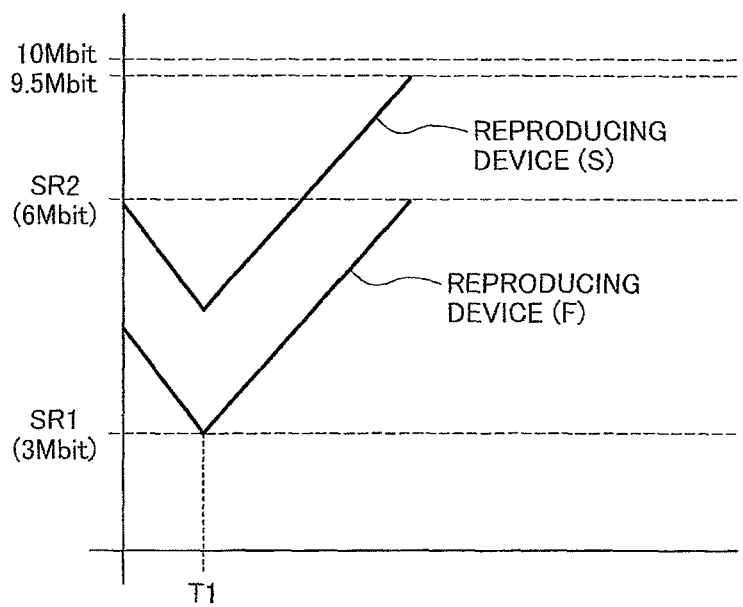
FIG. 5 is a diagram showing exemplary transitions of the remaining amount in the buffer memory of the reproducing device with the most advanced reproduction time and the reproducing device with the most delayed reproduction time in the video information reproducing system in FIG. 2.

FIG. 5 is a diagram showing the transitions of the amounts remaining in the buffer memory of the reproducing device (F) with the time that runs the fastest and the reproducing device (S) with the time that runs the slowest when the reproducing device 42 with the time that runs the fastest is selected as the representative device. The content server 41 resumes data distribution when the amount remaining in the fastest reproducing device (F) reaches the lower limit value SR1 at time T1; at this time, the slowest reproducing device (S) has more remaining data.

For example, with a video encoding bit rate of 10 Mbps, because of the above time skew, 3.5 Mbits more data remain in reproducing device (S) than in reproducing device (F).

If the capacity of the buffer memory 12 is 10 Mbits, the lower limit value SR1 is 3 Mbits, and the upper limit value SR2 is 6 Mbits, then when the amount remaining in reproducing device (F) is 6 Mbits, the amount remaining in reproducing device (S) is 9.5 Mbits, which approaches the limit capacity of the buffer memory, so that if reproduction (data transmission therefor) continues further, data to be reproduced will be discarded when the capacity of the buffer memory 12 of reproducing device (S) is exceeded, and accordingly a video picture with some frames missing will be displayed.

As described above, there has been the problem that because of differences in the frequencies of the crystal oscillators, prolonged continuation of reproduction causes loss of synchronization of the displays of the different video information display devices, leading in the worst case to overflow or underflow of the buffer memories and interruption or suspension of reproduction.

Figure 6:
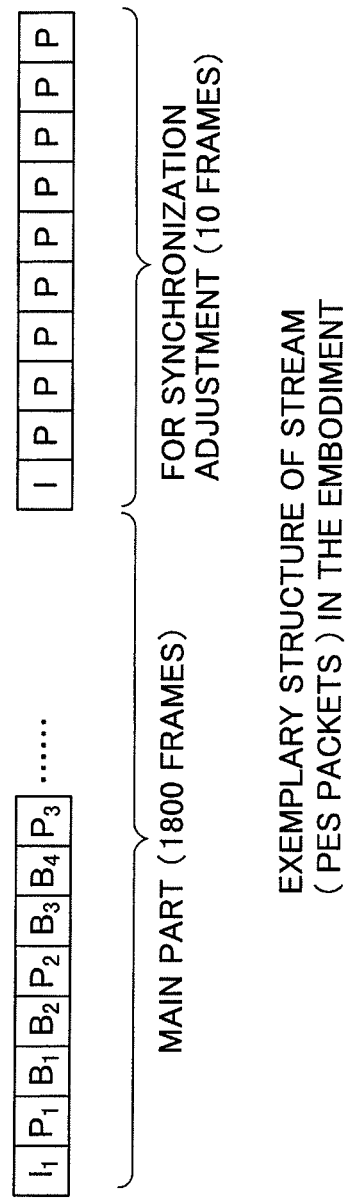
FIG. 6 is a diagram showing an example of the PES packet structure of MPEG data according to the first embodiment of the invention.

FIG. 6 is a diagram showing an exemplary improved PES packet sequence of video information for implementing the video information reproducing method according to the first embodiment of the invention.

Among the PES packets, those with reference character 'I' include I-pictures, those with reference character 'P' include P-pictures, and those with reference character 'B' include B-pictures. The subscripts '1', '2', '3', etc. attached to the reference characters 'I', 'P', 'B' are used to distinguish individual I-, P-, and B-pictures and also indicate the order of reproduction.

An I-picture is image information that has been encoded intra-frame (intra-frame encoded image information) and can be decoded independently. A P-picture is image information (inter-frame forward prediction encoded image information) that has been encoded by forward motion-compensating prediction with reference to a preceding picture (an I-picture or another P-picture); a B-picture is image information (inter-frame bidirectional prediction encoded image) that has been encoded by bidirectional motion-compensating prediction with reference to preceding and following pictures (I-pictures, P-pictures, or other B-pictures).

Here, if the reproduction time of the TS data is 60 seconds and the frame rate is 30 fps, there are 1800 (60×30=1800) PES packets of TS data in total, but in this embodiment, PES packets for a further ten frames are added for reproduction synchronization adjustment to the main part consisting of the above 1800 PES packets (the part included in the TS data even when the inventive synchronization adjustment is not performed), making a total of 1810 PES packets. The video images of the ten added frames are encoded to display the same video image as the video image in the final frame in the 60 seconds repetitively. The (group of) synchronization adjustment frames in the example shown include I-picture data for one frame consisting of the same video data as the video data of the last frame and P-picture data for nine frames that continuously display the same video image.

Such added synchronization adjustment frames may be held in a pre-authored form in the content server 41 or may be added on the content server 41 at the time of delivery by use of MPEG dummy pictures.

The first PES packet among the additional PES packets is an I-picture (for H.264, an IDR picture, which is also intra-frame encoded image information), and the subsequent PES packets include P-pictures or I-pictures (or IDR pictures) but not B-pictures. Because no B-pictures are included, the display sequence of the pictures for the ten added synchronization adjustment frames matches their data sequence. In, for example, the leading portion of the TS data in FIG. 6, however, the PES packet sequence is '$I_1$', '$P_1$', '$B_1$' and '$B_2$', but the actual display sequence is '$I_1$', '$B_1$', '$B_2$' and '$P_1$', so that the display sequence differs from the data sequence.

Figures 7, 8:
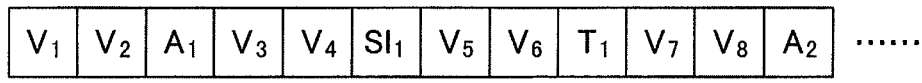
FIG. 7 is a diagram showing an example of the packet structure of a TS stream according to the first embodiment.
FIG. 8 is a diagram showing an example of the syntax of the synchronization adjustment packet in FIG. 7.

FIG. 7 is a diagram showing the improved TS data packet sequence for implementing the video information reproducing method according to the embodiment. The difference from the TS data in FIG. 4 is the multiplexing of an adjustment information packet in which adjustment packet information indicating how many packets there are from the head of the TS data to the first TS packet among the PES packets of the ten additional frames.

FIG. 8 is a diagram illustrating the syntax of the synchronization adjustment packet. The 'num_of_PES' parameter indicates the total number of PES packets (frames) added to the main data and available for synchronization adjustment. The following loop is repeated the number of times indicated by 'num_of_PES'. If there are ten frames, 'num_of_PES'=10.

'PTS_for_adjust(i)' indicates the PTS value at the head of each PES packet available for synchronization adjustment.

'SPN_for_adjust(i)' is a value indicating how many packets there are from the start of the TS data to the TS packet that includes the PES packet header with the value indicted by 'PTS_for_adjust(i)'.

Although the adjustment packet information is sent to the reproducing device 42 multiplexed with the TS packets in this embodiment, it need not necessarily be multiplexed with the TS packets; the adjustment packet information may be sent to the reproducing device 42 in an independent command.

In the content server 41 there are a plurality of TS data streams structured as in FIG. 7, which are delivered continuously to the reproducing devices 42. When a reproduction command is output from the user to the content server 41, the content server 41 starts delivering the TS data in a pre-instructed order.

In normal reproduction, from the adjustment information packet data included in the TS data, the CPU 21 anticipates the arrival of the TS packets including the PES packets of the additional ten frames and discards the TS packets from SPN_for_adjust(0) onward without storing them in the buffer memory 12.

Figure 9:
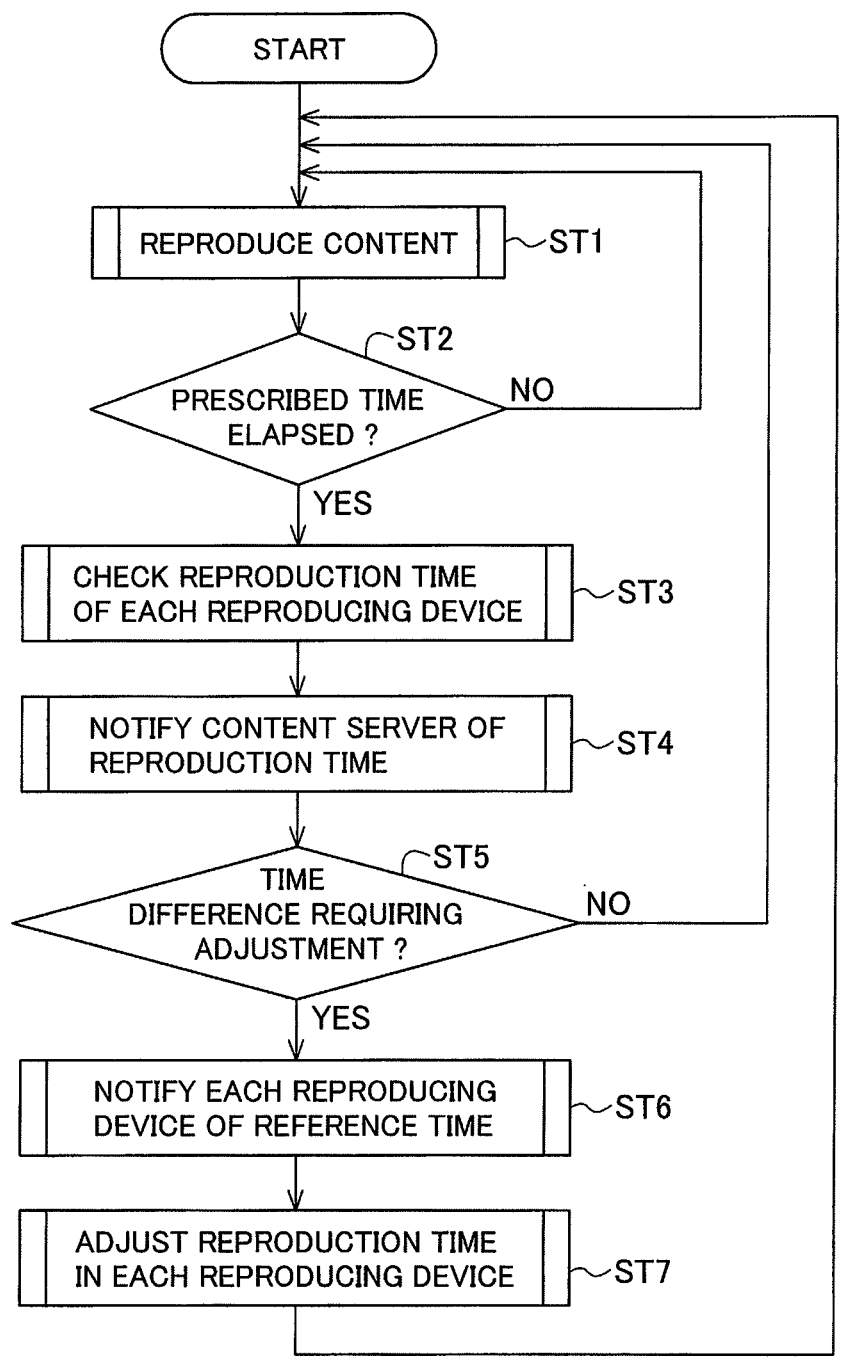
FIG. 9 is a flowchart illustrating the video information reproducing method according to the first embodiment of the invention.

FIG. 9 is a flowchart illustrating a processing sequence for synchronizing reproduction among the reproducing devices 42. Steps ST5 and ST6 indicate processing in the content server 41; the other steps indicate processing in the reproducing device 42.

During normal reproduction, when the reproduction of the main content is completed, the ten frames added as described above are not displayed (ST1). As described above, the crystal oscillator frequency accuracy is about 20 ppm, at which level loss of synchronization is not visible after only several minutes of reproduction. About once every several tens of minutes, i.e., whenever a prescribed time has elapsed (ST2), a check of the current reproduction time of each reproducing device 42 is made from the content server 41 (ST3).

In response to the check of the reproduction time from the content server 41, each reproducing device 42 notifies the content server 41 of its current reproduction time (ST4).

The content server 41 collates the reported time data and decides whether a synchronization adjustment of the reproduction times is necessary or not (ST5). For that purpose, it determines whether the difference between the most advanced reproduction time and the least advanced reproduction time is equal to or greater than a prescribed value: for example, equal to or greater than one frame.

If the reproduction time difference is equal to or greater than one frame and an adjustment is determined to be necessary, a reproducing device 42 with an average reproduction time is used as a reference reproducing device 42 and its reproduction time is sent to all the other reproducing devices 42 as a reference time (ST6).

Each reproducing device 42 that receives the reference time recognizes, from the difference between the reproduction time it reported earlier and the reference time sent from the content server 41, whether its reproduction is running ahead of or behind the reference reproducing device 42 and adjusts its reproduction time (ST7).

The reproducing device 42 determines whether or not the difference from the reference reproduction time sent by the content server 41 is equal to or less than one frame; if the reproduction time difference is within one frame, it reproduces the first five frames of the ten frames added for synchronization adjustment, and the CPU 21 discards the data from SPN_for_adjust(5) onward. Therefore, the total reproduction time of the TS data currently being reproduced corresponds to the main data plus five frames, and the last frame of the main data is displayed repeatedly for the last six frames. After the first five added frames have been reproduced, reproduction continues with the TS data of the next content.

Figure 10:
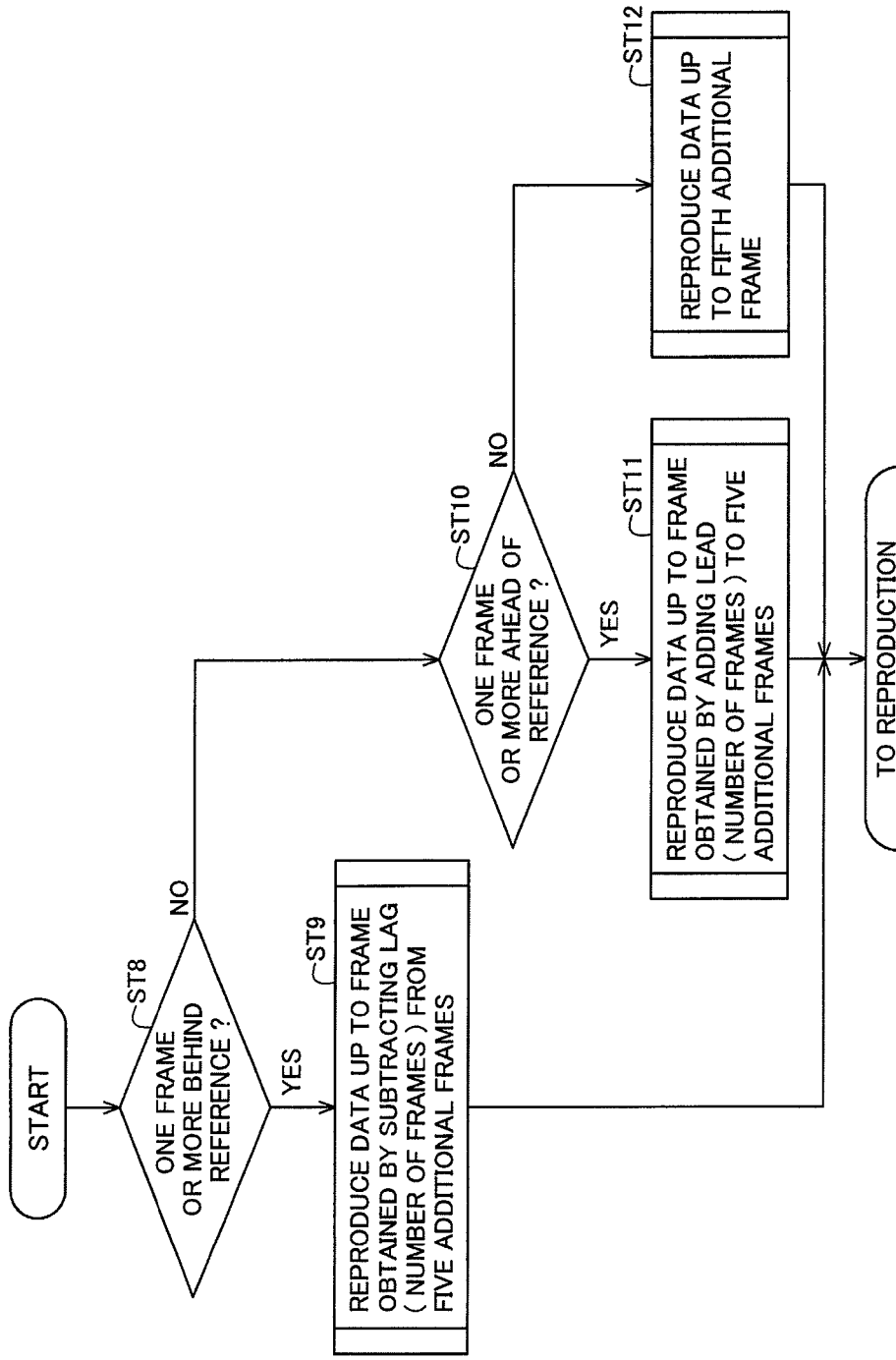
FIG. 10 is a flowchart showing details of step ST7 in FIG. 9.

FIG. 10 is a diagram illustrating details of the adjustment sequence in step ST7 in FIG. 9. First, whether or not reproduction lags the reproduction time (reference time) of the reference reproducing device 42 by one frame or more is determined (ST8).

A reproducing device 42 that determines that it lags the reference time by one frame or more then calculates the lag time from the reference time and its own reproduction time, calculates the number of frames corresponding to the lag time, and subtracts the number of frames corresponding to the lag time from five frames, thereby calculating the amount of data to store in the buffer memory 12. For example, if the lag time is 60 msec (corresponding to two frames), only the first three of the ten frames added at the end of the TS data are stored in the buffer memory 12, and the data from SPN_for_adjust(3) onward are discarded (ST9).

As a result, the total reproduction time of the TS data currently being reproduced corresponds to the main data plus three frames, and the last frame of the main data is displayed repeatedly during the last four frames. After the first three added frames are reproduced, reproduction continues with the TS data of the next content.

In step ST10, whether or not the reproduction time leads the reproduction time of the reference reproducing device 42 by one frame or more is determined. A reproducing device 42 that determines that it leads the reference time by one frame or more then calculates the lead time from the reference time and its own reproduction time, calculates the number of frames corresponding to the lead time, and adds the number of frames corresponding to the lead time to five frames, thereby calculating the amount of data to store in the buffer memory 12 (ST11). For example, if the lead time is 90 msec (corresponding to three frames), only the first eight of the ten frames added at the end of the TS data are stored in the buffer memory 12, and the data from SPN_for_adjust(8) onward are discarded. Accordingly, the total reproduction time of the TS data currently being reproduced corresponds to the main data plus eight frames, and the last frame of the main data is displayed repeatedly during the last nine frames. After the first eight added frames are reproduced, reproduction continues with the TS data of the next content.

In step ST10, if the reproducing device 42 determines that the lead time is within one frame, it reproduces the first five frames in the ten frames added to the end of the TS data and discards the data from SPN_for_adjust(5) onward (ST12). Accordingly, the total reproduction time of the TS data currently being reproduced corresponds to the main data plus five frames and the last frame of the main data is displayed repeatedly for the last six frames. After the first five added frames are reproduced, reproduction continues with the TS data of the next content.

In the above example, the total reproduction time for the content currently being reproduced by the reproducing device 42 that lags the reference time is two frames shorter than that of the reference reproducing device 42; the total reproduction time for the content currently being reproduced by the reproducing device 42 that leads the reference time is three frames more than that of the reference reproducing device 42.

Figure 11:
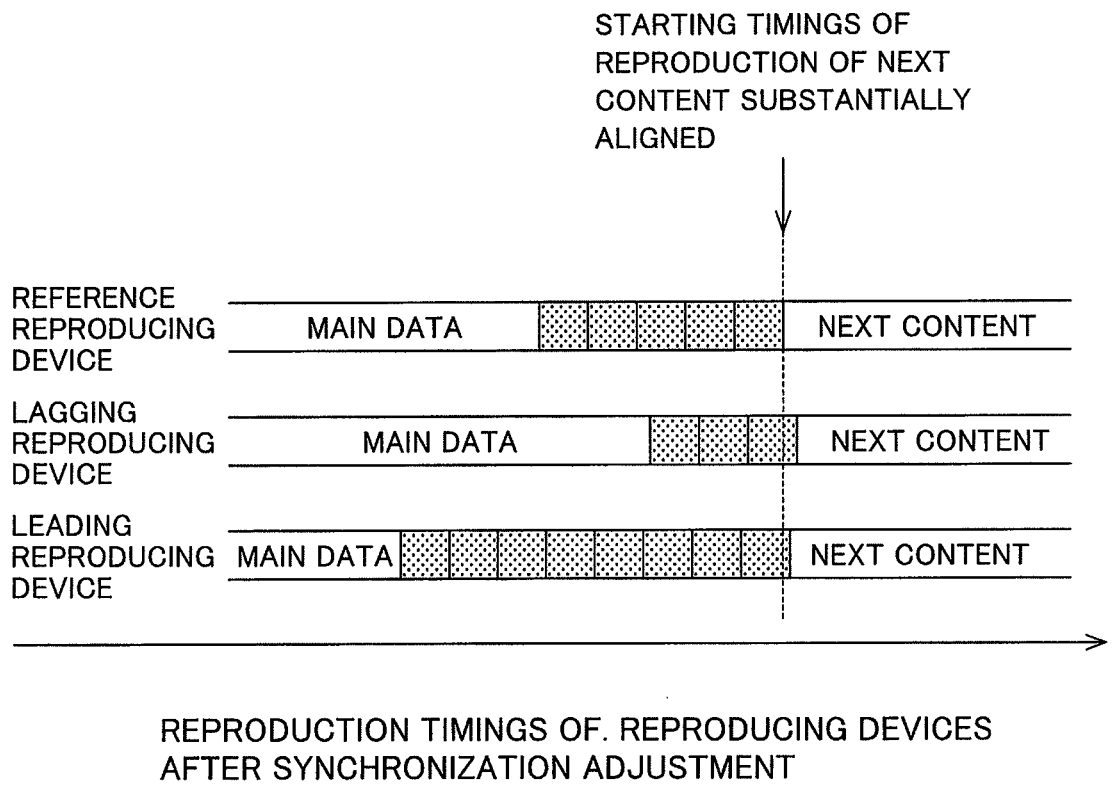
FIG. 11 is a diagram illustrating the reproduction of different numbers of additional frames at each reproducing device for synchronization adjustment in the first embodiment of the invention.

FIG. 11 is a diagram illustrating transitions in reproduction time of the reproducing devices 42 around a switch in content. When reproduction is performed according to the above sequence, the reproducing device 42 that lags the reference time makes the total reproduction time of the TS data it is currently reproducing shorter than the reference reproducing device 42 by the length of the lag, while the reproducing device 42 that leads the reference time makes the total reproduction time of TS data it is currently reproducing longer than the reference reproducing device 42 by the length of the lead, whereby the starting timings of the reproduction the TS data of the next content can be aligned to within a difference of one frame or less.

Figure 12:
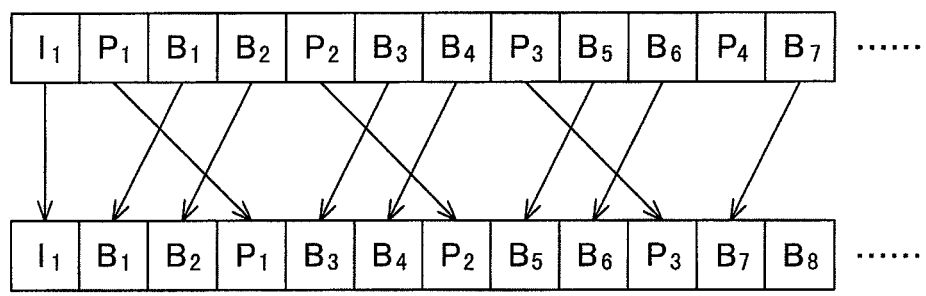
FIG. 12 is a diagram showing an example of the relationship between the decoding sequence and display sequence of ordinary MPEG-2 data.

In order to make the reproduction time of TS data adjustable with high precision at each reproducing device 42 as above, some constraints are necessary on the added adjustment TS data. FIG. 12 is a diagram illustrating a typical sequence of MPEG frames. In this case, data are delivered in the sequence '$I_1$', '$P_1$', '$B_1$', '$B_2$', ... from the content server 41, but the display sequence is '$I_1$', '$B_1$', '$B_2$', '$P_1$', ..... If the added data were to be arranged as in FIG. 12, to reproduce up to '$B_1$', the data of four frames '$I_1$', '$P_1$', '$B_1$', and '$B_2$' would have to be input to the buffer memory 12. The video decoder 14 would reproduce the four frames of '$I_1$', '$B_1$', '$B_2$', and '$P_1$', exceeding the intended number of displayed frames by two frames.

The four frames of '$I_1$', '$B_1$', '$B_2$', and '$P_1$' would similarly be reproduced when display up to '$B_2$' was intended or when display up to '$P_1$' was intended. Thus if the encoding is carried out so as to include B frames, an error of up to two frames occurs in the case shown in FIG. 12, resulting in lowered synchronization accuracy.

Figure 13:
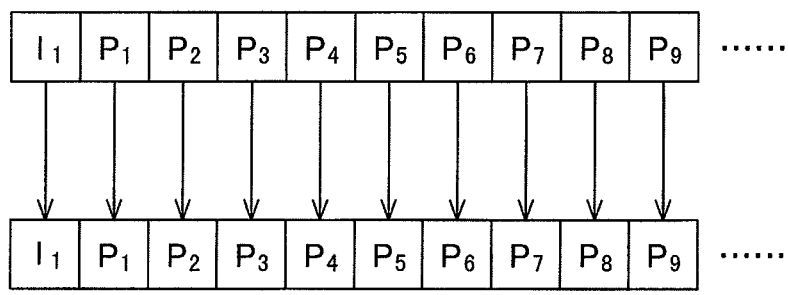
FIG. 13 is a diagram showing an example of the relationship between the decoding sequence and display sequence of the frames added for synchronization adjustment according to the first embodiment.

FIG. 13 shows a frame sequence designed for synchronization with one-frame precision. Unlike FIG. 12, encoding is performed without using B frames. This encoding provides a match between the frame sequence and reproduction sequence. Accordingly, to reproduce only three frames, the data of the three frames '$I_1$', '$P_1$', and '$P_2$' can be stored in the buffer memory and the subsequent frames can be discarded. Synchronization adjustment with frame precision is thus possible by not using B frames. Encoding without using B frames lowers the encoding efficiency, however, so that to obtain the same image quality as obtained by use of B frames, the data size must increase. In order to avoid this, it is preferable to encode the main part by using B frames and encode the adjustment frames without using B frames, but encoding the main data and adjustment frames with mutually different rules is also problematic in that the encoding becomes more complicated. Therefore, the adjustment frames are preferably encoded without using B frames in a system requiring precise synchronization, and are preferably encoded by use of B frames when high synchronization precision is not required.

As described above, by using TS data with reproduction time synchronization adjustment frames added at the end to adjust the amount of TS data added for synchronization adjustment that is stored in the buffer memory based on the information about reproduction time difference relative to the reproduction time of the reference reproducing device 42, it becomes possible to synchronize reproduction with high precision among the display devices.

In the description of this embodiment, the reproduction time of the reproducing device 42 with the value closest to the mean value of the reproduction times of all the reproducing devices 42 is set as the reference time, but it need not be the closest to the mean value; instead, it may be the median value, for example, or exactly the same effect may be obtained by setting the reproducing device 42 with the most advanced reproduction time as the reference, having the reproducing device 42 with the most advanced reproduction time reproduce all ten added frames, and having the other reproducing devices 42 reproduce numbers of additional frames reduced from ten frames according to the size of the deviation from the reference reproduction time. Similarly, exactly the same effect is also obtainable by setting the reproducing device 42 with the most delayed reproduction time as the reference, having the reproducing device 42 with the most delayed reproduction time reproduce no added frames, and having the other reproducing devices 42 reproduce numbers of frames that increase according to the size of the deviation from the reference reproduction time.

The present invention is applicable to, for example, display devices that perform displays on multiple screens in automobiles, trains, buildings, or the like, producing the effect of enabling the reproduction times of a plurality of display devices to be synchronized with high precision.

Second Embodiment

The adjustment method described in the first embodiment is for a case in which the variation in reproduction time among the reproducing devices 42 stays within the range of the number of frames provided for adjustment. However, there are cases in which reproduction becomes greatly out of synchronization because the CPU 21 in a reproducing device 42 experiences a sudden load, or the reproducing device 42 experiences electrical noise and is reset, and data delivery from the content server 41 starts before preparations for reproduction can be made. In these cases, the time skew becomes as long as several seconds, so that synchronization by the adjustment method in the first embodiment might take several tens of minutes to several hours to achieve.

Figure 14:
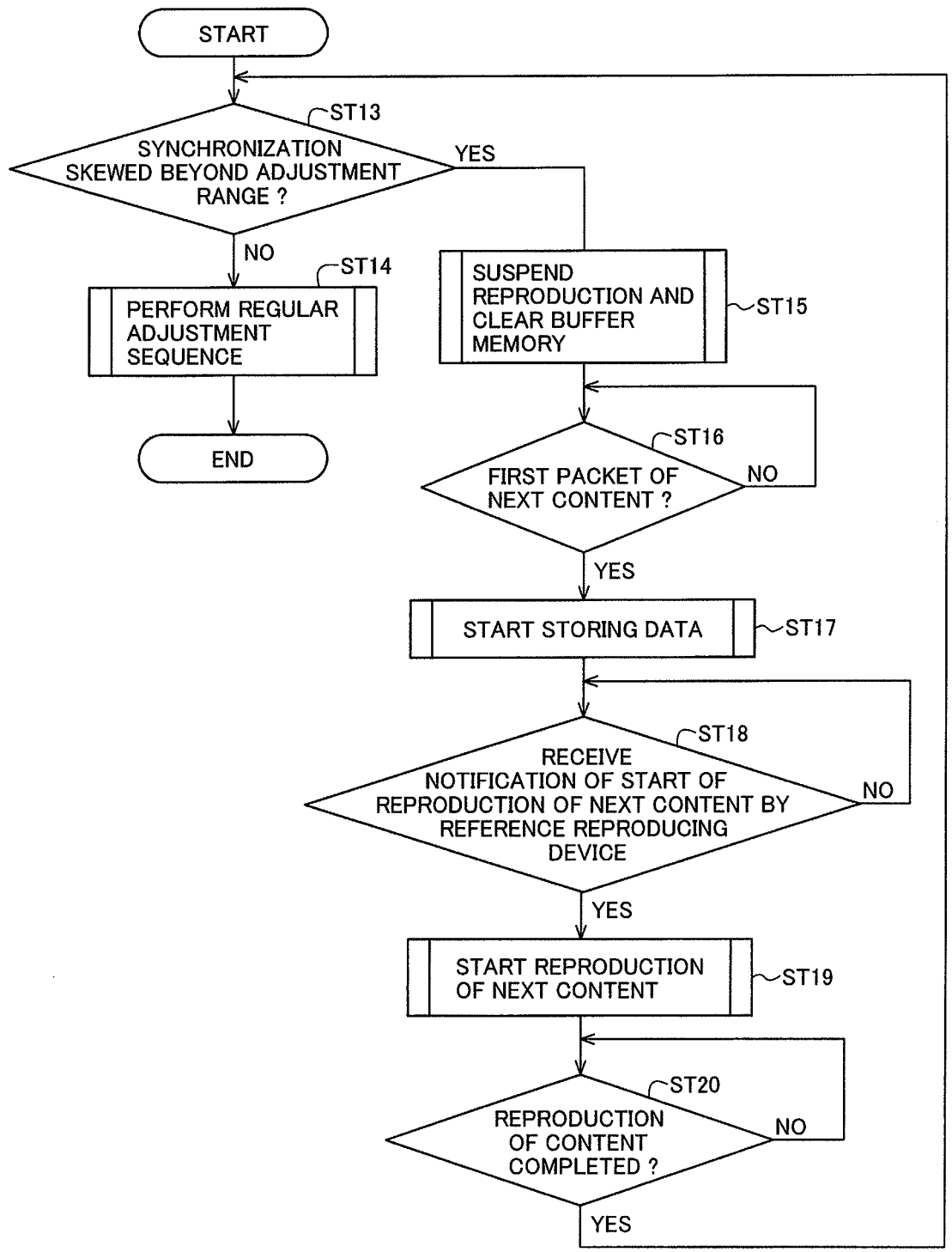
FIG. 14 is a flowchart illustrating a video information reproducing method according to a second embodiment of the invention.

FIG. 14 illustrates an improved sequence for performing adjustments in a short time in such cases, when there is substantial reproduction time skew. Steps ST18 and ST19 in FIG. 14 illustrate processing performed in the content server 41; the other steps illustrate processing in the reproducing devices 42.

First, whether or not the amount of deviation from the reproduction time of the reference reproducing device 42 is within the synchronizable range (within the range adjustable by the method described in the first embodiment) is determined (ST13).

If the deviation is determined to be within the synchronizable range, the process proceeds to step ST14, in which the regular adjustment (the adjustment described with reference to FIG. 10) is performed. Details of the adjustment in step ST14 will be omitted since they were given in the first embodiment.

If the amount of reproduction time deviation is determined to be outside the synchronizable range, the reproduction currently being performed is suspended and all data stored in the buffer memory 12 are cleared (ST15).

A reproducing device 42 in which reproduction is suspended waits for the completion of the delivery of the TS data of the content currently being reproduced and the arrival of the first TS packet of the next content (ST16). Upon detection of the first TS packet of the next content, the CPU 21 starts storing the data in the buffer memory 12 (ST17).

Next, the content server 41 commands the reference reproducing device 42 to notify the content server 41 when it starts reproduction of the first frame of the next content; when notified from the reference reproducing device 42 that reproduction of the next content has started (ST18), the content server 41 issues a reproduction start command to the reproducing device 42 in which reproduction was suspended (ST19), and the reproduction of content is resumed in the reproducing device 42 in which reproduction was suspended.

There are delays in having the content server 41 notified of the start of reproduction from the reference reproducing device 42 and delays until the reproducing device 42 in which the reproduction was suspended receives the reproduction start command from the content server 41, including network delays and delays due to software processing time, and there is a delay from the issuing of the reproduction command to the video decoder 14 until the first frame is displayed, so that at this point in time, the reproduction time of the reproducing device 42 in which reproduction was suspended is in a state that lags the other reproducing devices 42 by several frames. This lag, however, is within the range adjustable by the regular synchronization adjustment sequence, so that synchronization can be achieved in the next adjustment sequence.

As described above, a reproducing device 42 with a badly skewed reproduction time can be brought into synchronization at the adjustment of the next content by suspending reproduction and then resuming reproduction at the timing at which the reference reproducing device 42 starts reproduction of the first frame of the next content.

The present invention is applicable to, for example, display devices that perform displays on multiple screens in automobiles, trains, buildings, or the like, producing the effect of enabling the reproduction times of a plurality of display devices to be synchronized in a short time.

Reference Characters 10 reproducing section, 11 data receiving unit, 12 buffer memory, 13 demultiplexer, 14 video decoder, 15 audio decoder, 21 CPU (discrimination means, reproduction control means), 31 external display device, 41 content server, 42 reproducing device, 43 network.

What is claimed is:

1. A video information reproduction method for receiving content formed by a sequence including at least intra-frame encoded image information and inter-frame forward prediction encoded image information, and including time stamp information, from a content server connected by a network or from storage media, at a plurality of video information reproducing devices and decoding and reproducing the content at the video information reproducing devices, the video information reproduction method comprising:

selecting a video information reproducing device from among the plurality of video information reproducing devices as a reproduction time reference and detecting a reproduction time difference between each of the video information reproducing devices and the reference video information reproducing device; and for at least one of the video information reproducing devices, adjusting a number of frames to be reproduced such that:

when a detected reproduction time difference indicates that the reproduction of content by a corresponding video information reproducing device is lagging the reference video information reproducing device, decreasing a number of frames of encoded content to be reproduced relative to a number of frames to be reproduced by the reference video information reproducing device according to the lag time, and when the detected reproduction time difference indicates that the reproduction of content by the corresponding video information reproducing device is leading the reference video information reproducing device, increasing the number of frames of encoded content to be reproduced relative to the number of frames to be reproduced by the reference video information reproducing device according to the lead time, wherein a prescribed number of frames of duplicative or dummy image information are inserted in a predetermined location of the sequence to be distributed or read from the storage media, wherein the reference video information reproducing device is configured to reproduce a certain number of the frames of duplicative or dummy image information from reproduction, the certain number being less than the prescribed number, and wherein, for the at least one video information reproducing device, the number of frames of encoded content to be reproduced is increased or decreased relative to the number of frames to be reproduced by the reference video information reproducing device by causing the at least one video information reproducing device to reproduce a smaller or larger number of the frames of duplicative or dummy image information than the certain number.

2. The video information reproduction method of claim 1 wherein, in detecting the reproduction time difference between each of the video information reproducing devices and the reference video information reproducing device, the content server collates reproduction times reported from each of the video information reproducing devices and selects a video information reproducing device with a reproduction time closest to an average value to be the reference.

3. The video information reproduction method of claim 1 wherein, in detecting the reproduction time difference between each of the video information reproducing devices and the reference video information reproducing device, the content server collates reproduction times reported from each of the video information reproducing devices and selects a video information reproducing device with the most delayed reproduction time to be the reference.

4. The video information reproduction method of claim 1 wherein, in detecting the reproduction time difference between each of the video information reproducing devices and the reference video information reproducing device, the content server collates reproduction times reported from each of the video information reproducing devices and selects a video information reproducing device with the most advanced reproduction time to be the reference.

5. The video information reproduction method of claim 1, further comprising:

deciding whether the detected reproduction time difference is within a range synchronizable by the adjustment;

when the difference is decided not to be within the synchronizable range, suspending reproduction of the content currently being reproduced and discarding the data of the content stored in a buffer memory;

in the video information reproducing device in which the reproduction is suspended, beginning when the next content is received, storing the data of the content in the buffer memory; and when the video information reproducing device in which the reproduction is suspended is notified by the content server of a timing at which the reference video information reproducing device has started reproduction of the next content, starting reproduction of the next content on reception of such notification.

6. The video information reproduction method of claim 1, wherein the intra-frame encoded image information and inter-frame forward encoded image information are MPEG-2 or H.264 encoded information.

7. A video information reproduction system for synchronizing the decoding and reproduction of content formed by a sequence including at least intra-frame encoded image information and inter-frame forward prediction encoded image information, and including time stamp information, received via a network or read from storage media by a plurality of video information reproducing devices, the video information reproduction system comprising:

a content server connected to the plurality of video information reproducing devices via the network, the content server comprising a processor programmed to select a video information reproducing device from among the plurality of video information reproducing devices as a reproduction time reference and detect a reproduction time difference between each of the video information reproducing devices and the reference video information reproducing device; and a processor for at least one of the video information reproducing devices programmed to, upon receiving notification from the content server of the detected reproduction time difference of the corresponding video information reproducing device adjust a number of frames to be reproduced by the corresponding video information reproducing device such that:

when the notified reproduction time difference indicates that the reproduction of content by the corresponding video information reproducing device is lagging the reference video information reproducing device, decrease a number of frames of encoded content to be reproduced relative to a number of frames to be reproduced by the reference video information reproducing device according to the lag time, and when the notified reproduction time difference indicates that the reproduction of content by the corresponding video information reproducing device is leading the reference video information reproducing device, increase a number of frames of encoded content to be reproduced relative to the number of frames to be reproduced by the reference video information reproducing device according to the lead time, wherein a prescribed number of frames of duplicative or dummy image information are inserted in a predetermined location of the sequence to be distributed or read from the storage media, wherein the reference video information reproducing device is configured to reproduce a certain number of the frames of duplicative or dummy image information from reproduction, the certain number being less than the prescribed number, and wherein the processor for the at least one video information reproducing device increases or decreases the number of frames of encoded content to be reproduced relative to the number of frames to be reproduced by the reference video information reproducing device by causing the at least one video information reproducing device to reproduce a larger number or a smaller number of the frames of duplicative or dummy image information than the certain number.

8. The video information reproduction system of claim 7 wherein, in detecting the reproduction time difference between each of the video information reproducing devices and the reference video information reproducing device, the content server collates reproduction times reported from each of the video information reproducing devices and selects a video information reproducing device with a reproduction time closest to an average value to be the reference.

9. The video information reproduction system of claim 7 wherein, in detecting the reproduction time difference between each of the video information reproducing devices and the reference video information reproducing device, the content server collates reproduction times reported from each of the video information reproducing devices and selects a video information reproducing device with the most delayed reproduction time to be the reference.

10. The video information reproduction system of claim 7 wherein, in detecting the reproduction time difference between each of the video information reproducing devices and the reference video information reproducing device, the content server collates reproduction times reported from each of the video information reproducing devices and selects a video information reproducing device with the most advanced reproduction time to be the reference.

11. The video information reproduction system of claim 7,
wherein a decision is made by the system as to whether the detected reproduction time difference for a particular video information reproducing device is within a range synchronizable by the adjustment of the number of frames to be reproduced, and wherein a processor for the particular video information reproducing device is further programmed to:
when the difference is decided not to be within the synchronizable range, suspend reproduction of the content currently being reproduced and discard the data of the content stored in a buffer memory;
store the data of the next content in the buffer memory, beginning when the next content is received, in the particular video information reproducing device in which the reproduction is suspended; and
when notified by the content server of a timing at which the reference video information reproducing device has started reproduction of the next content, start reproduction of the next content on reception of such notification.

12. The video information reproduction system of claim 7, wherein the intra-frame encoded image information and inter-frame forward encoded image information are MPEG-2 or H.264 encoded information.

\* \* \* \* \*